United States Patent
Fischer et al.

(10) Patent No.: US 10,341,772 B2
(45) Date of Patent: Jul. 2, 2019

(54) AUDIO STICK FOR CONTROLLING WIRELESS SPEAKERS

(71) Applicant: DOLBY LABORATORIES LICENSING CORPORATION, San Francisco, CA (US)

(72) Inventors: David Matthew Fischer, San Francisco, CA (US); Sripal S. Mehta, San Francisco, CA (US); Timothy James Eggerding, Oakland, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/756,555

(22) PCT Filed: Sep. 1, 2016

(86) PCT No.: PCT/US2016/049949
§ 371 (c)(1),
(2) Date: Feb. 28, 2018

(87) PCT Pub. No.: WO2017/040816
PCT Pub. Date: Mar. 9, 2017

(65) Prior Publication Data
US 2018/0255398 A1    Sep. 6, 2018

Related U.S. Application Data
(60) Provisional application No. 62/213,838, filed on Sep. 3, 2015.

(30) Foreign Application Priority Data
Oct. 8, 2015  (EP) .................................. 15189004

(51) Int. Cl.
*H04R 3/12* (2006.01)
*H04S 7/00* (2006.01)
*G06F 3/16* (2006.01)

(52) U.S. Cl.
CPC ............... *H04R 3/12* (2013.01); *G06F 3/162* (2013.01); *H04S 7/301* (2013.01); *H04R 2420/07* (2013.01); *H04R 2420/09* (2013.01)

(58) Field of Classification Search
CPC ...... H04R 29/00; H04R 2420/09; H04R 3/12; H04R 2420/07; H04S 7/301
(Continued)

(56) References Cited

U.S. PATENT DOCUMENTS

| 5,708,718 A | 1/1998 | Ambourn |
| 8,930,003 B2 * | 1/2015 | Krug ..................... H04R 29/00 700/94 |

(Continued)

FOREIGN PATENT DOCUMENTS

| TW | M290636 | 5/2006 |
| WO | 2016/148935 | 9/2016 |

OTHER PUBLICATIONS

Audioengine W3 Wireless Audio Adapter http://audioengineusa.com/Store/W3-Wireless-Audio-Adapter, Mar. 16, 2015.
(Continued)

*Primary Examiner* — Disler Paul

(57) ABSTRACT

A system and method of providing a signal to wireless speakers. An audio stick connects to a source device and provides the audio signal to the wireless speakers. The audio stick combines the functionality of two separate devices: an audio receiver device and a transmitter device for the wireless speakers.

20 Claims, 4 Drawing Sheets

(58) Field of Classification Search
USPC .................................................... 381/77–80
See application file for complete search history.

(56) References Cited

U.S. PATENT DOCUMENTS

| | | | |
|---|---|---|---|
| 9,106,192 B2* | 8/2015 | Sheen | H03G 5/005 |
| 9,614,881 B2* | 4/2017 | Krug | H04R 29/00 |
| 9,991,862 B2* | 6/2018 | Kim | H03G 5/165 |
| 2004/0234088 A1 | 11/2004 | McCarty | |
| 2005/0058307 A1* | 3/2005 | Yang | H04H 60/04 |
| | | | 381/119 |
| 2006/0008094 A1 | 1/2006 | Huang | |
| 2009/0081948 A1 | 3/2009 | Banks | |
| 2009/0097487 A1 | 4/2009 | Mishra | |
| 2009/0097503 A1 | 4/2009 | Jain | |
| 2011/0142267 A1 | 6/2011 | McCarty | |
| 2011/0314401 A1* | 12/2011 | Salisbury | H04N 5/232 |
| | | | 715/771 |
| 2012/0259612 A1* | 10/2012 | Lyons | G06F 3/162 |
| | | | 703/21 |
| 2015/0215407 A1 | 7/2015 | Millen | |

OTHER PUBLICATIONS 802.15.1 standards "ANSI/IEEE 802.15.1-2005—IEEE Standard for Information technology—Local and metropolitan area networks—Specific requirements—Part 15.1a: Wireless Medium Access Control (MAC) and Physical Layer (PHY) specifications for Wireless Personal Area Networks (WPAN)".

* cited by examiner

AUDIO STICK FOR CONTROLLING WIRELESS SPEAKERS

CROSS-REFERENCE TO RELATED APPLICATION

This application claims priority to U.S. Provisional Patent Application No. 62/213,838, filed on Sep. 3, 2015 and European Patent Application No. 15189004.3, filed on Oct. 8, 2015, each of which is incorporated herein by reference in its entirety.

BACKGROUND

The present invention relates to home theater equipment, and in particular, to devices for connecting between source devices and wireless speakers.

Unless otherwise indicated herein, the approaches described in this section are not prior art to the claims in this application and are not admitted to be prior art by inclusion in this section.

A common component in home entertainment environments (home theater, home television, etc.) is an audio/video receiver (AVR). The AVR generally performs three functions. First, the AVR provides a connection point for multiple source devices, and the AVR is responsible for switching among the inputs. Second, the AVR performs amplification for wired speakers. Third, the AVR performs audio decoding and processing (e.g., surround sound processing, Dolby Pro Logic™ processing, Dolby Digital™ processing, Dolby TrueHD™ processing, etc.).

Another common component besides the AVR is an audio-only receiver, such as a soundbar, soundbase, etc. These products may only have analog audio inputs, or digital audio inputs via S/PDIF. They do not have video inputs, and are simpler products than the AVR. The input to the audio-only component device is often the analog or S/PDIF digital output of the television.

A recent development in home entertainment environments is media sticks. In general, a media stick provides a wired connection to a display device that displays the content (e.g., a television), and another connection (often wireless) to a source device that provides the content. A media stick generally has the form factor of a "dongle", sized such that it can be easily grasped in-hand, and has one or more input, output and power supply interfaces. The interfaces of the media stick may be connected to cords or other wired connectors, or may have short corded portions that extend the interfaces beyond the body of the media stick. Media sticks may also be referred to as streaming sticks. A media stick may be controlled by a separate device, such as a remote control or an application on a mobile telephone.

Examples of media sticks include the Chromecast™ media stick from Google, Inc., the Fire TV Stick™ from Amazon, Inc., and the Roku Streaming Stick™ from Roku, Inc. The Chromecast™ media stick, for example, has a High-Definition Multimedia Interface (HDMI™) output for connecting to the HDMI™ input of a television, a power input, and a wireless interface for interacting with a control application on a mobile phone and for receiving content. The Chromecast™ media stick may receive the content from a nearby device (e.g., a mobile telephone, a laptop computer, etc.) or may connect to a router and receive the content via the internet (e.g., from the YouTube™ website, from the HBO Go™ website, etc.).

Media sticks may be considered to fall within a subset of devices referred to as digital media players, digital media adapters, or micro-consoles. Other types of digital media players include devices in the form factor of set-top boxes (larger than dongles) that connect to a display device via a cable. Examples of these larger devices include the Apple TV™ from Apple, Inc., the Fire TV™ from Amazon, Inc., and the Roku Streaming Player™ from Roku, Inc.

Another type of device used in home entertainment environments is wireless adapters. Wireless adapters may be used to make a wireless connection in place of a wired connection. Wireless adapters may be classified as a cable replacement technology. Wireless adapters generally come as a pair, with a sender adapter providing the source for the wireless connection and a receiver adapter providing the sink for the wireless connection. An example of a wireless adapter is the W3 Wireless Audio Adapter from Audioengine LLC.

Another type of device used in home entertainment environments is wireless speakers. In general, wireless speakers receive the input audio signal wirelessly, instead of receiving an electrical audio signal via a wire. The wireless speakers may be a single device (e.g., a sound bar) or multiple devices (e.g., center, left, right, left surround, and right surround speakers), and may output one or more audio channels (e.g., stereo, 5.1 surround, etc.). Wireless speakers often connect to the audio source via a Bluetooth™ connection, a WiFi™ connection, or proprietary connections (e.g., using other radio frequency transmissions), which may (or may not) be based on WiFi™ standards or other standards.

SUMMARY

Given the above, there is a need to replace the AVR. First, wireless speakers often include their own amplifiers, so the amplification functions of the AVR are not required. Second, audio decoding and processing may be performed by devices other than the AVR. Third, many televisions include multiple audio outputs such as S/PDIF (Sony/Philips Digital Interface Format) connectors, reducing the need for the interconnection function of the AVR. An embodiment is directed to an audio stick that replaces the AVR and transmits the audio signal to wireless speakers.

In addition, an embodiment is directed to an audio stick that replaces wireless adapters (or other pairs of cable replacement devices). The audio stick decodes an audio signal into separate streams (e.g., surround sound) to each receiving speaker, unlike wireless adapters in which one transmitting adapter sends the same signal to one or more receiving adapters.

According to an embodiment, an apparatus interfaces between a digital audio source device and one or more wireless speakers. The apparatus includes a connector, an input digital audio interface, a processor, and an output audio transmitter, wherein the output audio transmitter is included in a wireless transceiver. The connector connects to the digital audio source device and receives power from the digital audio source device. The input digital audio interface receives an input digital audio signal from the digital audio source device via a wired signal path. The processor receives the input digital audio signal from the input digital audio interface and generates an output digital audio signal comprising a surround audio signal. The output audio transmitter receives the output digital audio signal from the processor and transmits the output digital audio signal to the one or more wireless speakers via a wireless signal path. The wireless transceiver receives audio data from a first wireless speaker via the wireless signal path.

During a calibration phase, the output audio transmitter may transmit individual, pre-determined calibration tones to one or more wireless speakers. At this, the calibration tones may be unique for each wireless speaker and may be used, when rendered by an individual wireless speaker, to unambiguously identify the individual wireless speaker. At the wireless speakers, the calibration tones may be stored in local memory and may be rendered by the wireless speakers when necessary, e.g. under control of the processor.

The audio data received by the wireless transceiver may have been recorded by the first wireless speaker from an audio signal rendered by a second wireless speaker. The audio signal may be e.g. a (single) calibration tone which is rendered by the second wireless speaker and recorded/monitored by a microphone of the first wireless speaker. Moreover, the audio signal may comprise several calibration tones rendered by several wireless speakers which are positioned at different relative locations within a 3D reproduction environment. In other words, the audio signal recorded by the first wireless speaker may be a superposition of calibration tones from wireless speakers positioned at different angles and distances relative to the first speaker.

Upon recording the audio data corresponding to the audio signal, the first wireless speaker may transmit raw audio data corresponding to the audio signal or a compressed version of the audio data to the wireless transceiver of the apparatus. Alternatively or additionally, other wireless speakers may transmit audio data locally recorded at said other wireless speakers to the wireless transceiver. Thus, the described apparatus enables centralized processing of audio data for determining relative location information of a plurality of wireless speakers, thereby reducing the computational burden at the individual speakers. In other words, it becomes possible to use small and inexpensive wireless speakers which record the audio data with the help of microphones and forward the audio data to the wireless transceiver for centralized processing.

The processor may perform cross-correlation of each of the captured audio signals at each of the wireless speakers with the original calibration tones. The result of the cross-correlation may yield a measured delay representing the propagation time from the emitting wireless speaker to the recording wireless speaker. By using a known speed of sound constant, distances between the wireless speakers may be estimated. These distances can then be fed into a non-linear optimization algorithm which may solve for the relative locations of the concerned wireless speakers.

Put in a different way, the processor may determine, based on the received audio data, a relative location of the first wireless speaker or the second wireless speaker. For example, the relative location may be a relative location of the first wireless speaker with regard to the second wireless speaker within the reproduction environment of the wireless speakers. Alternatively, the relative location may be a relative location of the second wireless speaker with regard to the first wireless speaker. Additionally, the relative location of the first wireless speaker or the second wireless speaker may include an orientation of the first wireless speaker with regard to the second wireless speaker or an orientation of the second wireless speaker with regard to the first wireless speaker, respectively. In general, the relative location may include two-dimensional or three-dimensional coordinates of the wireless speakers with regard to a reference point, which may be e.g. the position of the first wireless speaker or the apparatus.

The processor may then generate the output digital audio signal comprising the surround audio signal based on one or more determined relative locations and the input digital audio signal. In this way, the processor may carry out an auto-discovery process for determining relative positions of the wireless speakers and modify the surround audio signal accordingly so as to optimize the surround effect based on the speaker positions.

The connector may be a universal serial bus (USB) connector. The input digital audio interface may be a Sony/Philips digital interface format (S/PDIF) interface with a coaxial connector or an optical connector.

The output audio transmitter may implement the Institute of Electrical and Electronics Engineers (IEEE) 802.11 protocol. The apparatus may further include a wireless transceiver that implements the Institute of Electrical and Electronics Engineers (IEEE) 802.15.1 protocol. The wireless transceiver may exchange information with a remote control device or a mobile telephone that implements a remote control application. The information may include pairing information that pairs the apparatus and the remote control device or the mobile telephone. The apparatus may exchange information with the one or more wireless speakers, where the information includes pairing information that pairs the apparatus and the one or more wireless speakers. The one or more wireless speakers may be a sound bar or wireless headphones.

According to another embodiment, a method interfaces between a digital audio source device and one or more wireless speakers. The method includes receiving power from the digital audio source device by a connector that connects to the digital audio source device. The method further includes receiving an input digital audio signal from the digital audio source device by an input digital audio interface via a wired signal path. The method further includes receiving, by a processor, the input digital audio signal from the input digital audio interface. The method further includes generating, by the processor, an output digital audio signal. The method further includes receiving, by an output audio transmitter, the output digital audio signal from the processor. The method further includes transmitting, by the output audio transmitter, the output digital audio signal to the one or more wireless speakers via a wireless signal path. The audio stick may perform this method.

According to another embodiment, an apparatus interfaces between a digital audio source device and one or more wireless speakers. The apparatus includes a first means, a second means, a third means, and a fourth means. The first means is for connecting to the digital audio source device, and is for receiving power from the digital audio source device. The second means is for receiving an input digital audio signal from the digital audio source device via a wired signal path. The third means is for receiving the input digital audio signal from the second means, and is for generating an output digital audio signal. The fourth means is for receiving the output digital audio signal from the third means, and is for transmitting the output digital audio signal to the one or more wireless speakers via a wireless signal path.

According to another embodiment, a system interfaces with a digital audio source device. The system includes an audio stick and one or more wireless speakers. The audio stick includes a connector, an input digital audio interface, a processor, and an output audio transmitter. The connector connects the audio stick to the digital audio source device and provides power from the digital audio source device to the audio stick. The input digital audio interface receives an input digital audio signal from the digital audio source device via a wired signal path. The processor receives the input digital audio signal from the input digital audio interface and generates an output digital audio signal. The output audio transmitter receives the output digital audio signal from the processor and transmits the output digital audio signal via a wireless signal path to the one or more wireless speakers. The one or more wireless speakers receive the output digital audio signal via the wireless signal path and output an acoustic signal that corresponds to the output digital audio signal.

The system may further include a remote control that exchanges information with the audio stick.

The following detailed description and accompanying drawings provide a further understanding of the nature and advantages of various implementations.

DETAILED DESCRIPTION

Figure 1:
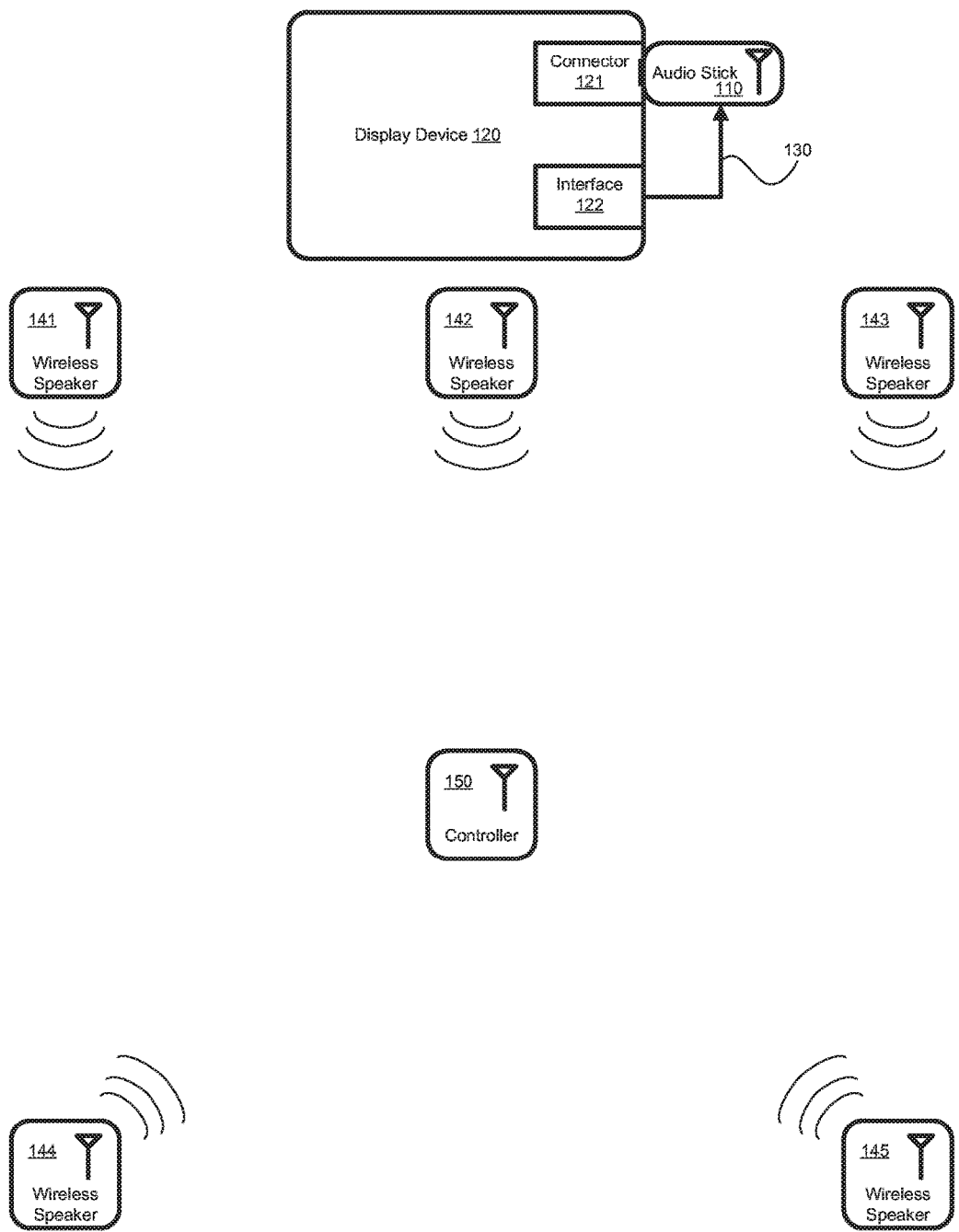
FIG. 1 is a block diagram of a system 100 in a home entertainment environment.

Described herein are techniques for audio signal processing. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having an inclusive meaning. For example, "A and B" may mean at least the following: "both A and B", "at least both A and B". As another example, "A or B" may mean at least the following: "at least A", "at least B", "both A and B", "at least both A and B". As another example, "A and/or B" may mean at least the following: "A and B", "A or B". When an exclusive-or is intended, such will be specifically noted (e.g., "either A or B", "at most one of A and B").

This document uses the terms "home entertainment environment", "home theater environment" and "home television environment". These terms are generally synonymous and are used descriptively to provide context for the audio sticks and systems described herein. It is to be understood that the audio sticks and systems described herein are not limited to home usage, and may be used in other locations.

This document uses the terms "interface" and "connector". In general, these terms are used interchangeably. When precision is desired, the term "interface" is used when describing aspects that are more generally functional, and the term "connector" is used when describing aspects that are more generally structural.

This document uses the term "paired". In general, this term refers to the audio stick being "paired" with one or more wireless speakers, or to the audio stick being "paired" with a remote control or a mobile telephone. Thus, the usage "paired speakers" refers to "the one or more speakers paired with the audio stick", not to "a pair of two speakers"; and the usage "the paired remote" refers to "the remote control paired with the audio stick", not to "the pair of two remote controls". Note that "paired" when referring to the audio stick differs from "pair" when referring to wireless adapters or other cable replacement devices; a "pair" of wireless adapters generally come as a pair of two devices (a transmitter device and a receiver device).

This document uses the term "wireless". Two general types of wireless transmissions are discussed: the Institute of Electrical and Electronics Engineers (IEEE 802.11) standard, and the IEEE 802.15.1 standard. A particular implementation of the IEEE 802.11 standard is the WiFi™ certified standard. A particular implementation of the IEEE 802.15.1 standard is the Bluetooth™ certified standard. It is to be understood that the discussion of a certified standard is for descriptive purposes of a particular embodiment, and that other embodiments may implement the general IEEE standard, or other wireless standards.

This document uses the term "transmitter". A transmitter may also include a receiver. A combined transmitter and receiver may be referred to as a transceiver. In general, the terms "transmitter" and "transceiver" are used interchangeably in this document.

FIG. 1 is a block diagram of a system 100 in a home entertainment environment. The system 100 includes an audio stick 110, a display device 120, a connector 130, wireless speakers 141, 142, 143, 144 and 145, and a controller 150. In general, the display device 120 displays video content, and the audio stick 110 transmits audio content (from the display device 120) to the wireless speakers 141-145. The system 100 may include other devices (not shown), such as source devices that provide content to the display device 120. For example, a Blu-Ray™ device (not shown) may provide audio and video content to the display device 120 via a HDMI™ (high-definition multimedia interface) connector.

The display device 120, as mentioned above, generally displays video content. The display device 120 may be, for example, a high-definition (HD) television, a digital media adapter, a gaming console, a computer monitor, etc. The display device 120 may receive the content in various formats from various sources. For example, the display device 120 may receive content from an antenna or a cable box via a coaxial connector. The display device 120 may receive content from a Blu-Ray™ device, a computer, a set-top box, or a gaming console via a HDMI™ connector. The display device 120 may receive content via a streaming stick such as the Chromecast™ device. The display device 120 may receive audio and video content from another source device, and may provide the audio content to the audio stick 110. The display device 120 may receive video content from another source device, and the other source device may provide the audio content to the audio stick 110. The display device 120 may include other interfaces for inputs and outputs.

The display device 120 includes a connector 121 and a digital audio interface 122 for interfacing with the audio stick 110. The connector 121 provides a physical connection for the audio stick 110 and may be a female universal serial bus (USB) connector. The connector 121 also provides power to the audio stick 110. The digital audio interface 122 provides a digital audio signal to the audio stick 110. The digital audio interface 122 may be connected to the audio stick 110 via the connector 130. The digital audio interface 122 may be a Sony/Philips digital interface format (S/PDIF) interface. The S/PDIF interface may be compatible with either an electrical coaxial cable (with a Radio Corporation of America (RCA) connector) or an optical fiber (with a Toshiba link (TOSLINK) connector).

The audio stick 110, as mentioned above, generally receives the digital audio signal from the display device 120 (or from another source device connected to the display device 120), decodes the digital audio signal, and transmits the digital audio signal to the wireless speakers 141-145 via a wireless path. The audio stick 110 connects to the display device 120 via a wired path, e.g. via a male USB connector (as discussed in more detail in FIG. 3), that also provides the power for the audio stick 110. The audio stick 110 also connects to the display device 120 (or to another source device) via another wired path, e.g. via an S/PDIF connector (as discussed in more detail in FIG. 3), that provides the digital audio signal using the connector 130.

As discussed in more detail below, the audio stick 110 is paired to the wireless speakers 141-145. The audio stick 110 wirelessly transmits the digital audio signal to the wireless speakers 141-145 using a selected one or more protocols including the Bluetooth™ protocol, the WiFi™ protocol, the Miracast™ protocol, or other wireless protocols. Additional details regarding how the audio stick 110 manages the connection to, the calibration of, and the timing between the wireless speakers 141-145 are provided below.

The connector 130, as mentioned above, generally provides the digital audio signal from the display device 120 (or other source device) to the audio stick 110. The connector 130 may be a coaxial or optical S/PDIF cable having a length of between 5-20 cm.

The wireless speakers 141-145, as mentioned above, generally receive the transmitted digital audio signal from the audio stick 110 via a wireless path and output it as an acoustic signal (e.g., sound). The wireless speakers 141-145 may have a wired connection to a power source. The wireless speakers 141-145 are responsive to various control signals from the audio stick 110 (e.g., volume control, etc.), as further discussed below. The wireless speakers 141-145 are paired to the audio stick 110 as further discussed below, e.g. using Bluetooth™ signals, WiFi™ signals, or other wireless signals.

Five wireless speakers 141-145 are shown to illustrate a 5-channel surround sound configuration. The speaker 141 corresponds to front-left, the speaker 142 corresponds to center, the speaker 143 corresponds to front-right, the speaker 144 corresponds to surround-left, and the speaker 145 corresponds to surround-right. A wireless subwoofer (not shown) may be used to output the low-frequency effects channel, for 5.1-channel surround sound.

Besides the five wireless speakers 141-145, other wireless speaker quantities and configurations may be used with the audio stick 110. For example, stereo sound may be implemented with two wireless speakers, or with wireless headphones. Surround sound 7.1 may be implemented with seven wireless speakers and one wireless subwoofer. A sound bar may include multiple speakers in one housing and may output sound in various formats. A flexible speaker layout may be used instead of the five wireless speakers 141-145. A flexible layout does not prescribe the number and position of speakers, or the number and type of channels; instead, the system implements object audio. A flexible layout is interesting for wireless speakers since their positioning need not account for speaker wires.

The controller 150 generally controls the audio stick 110, by providing a user interface and by transmitting commands to the audio stick 110. Common commands include volume increase, volume decrease, mute, power off, and power on. The controller 150 may also be referred to as the remote control 150. The controller 150 may also coordinate a setup process of pairing the controller 150 to the audio stick 110, and pairing the audio stick 110 to the wireless speakers 141-145. The controller 150 may be a dedicated remote control device, or may be a remote control application executed by a mobile telephone. Further details of the controller 150 are provided below.

Figure 2:
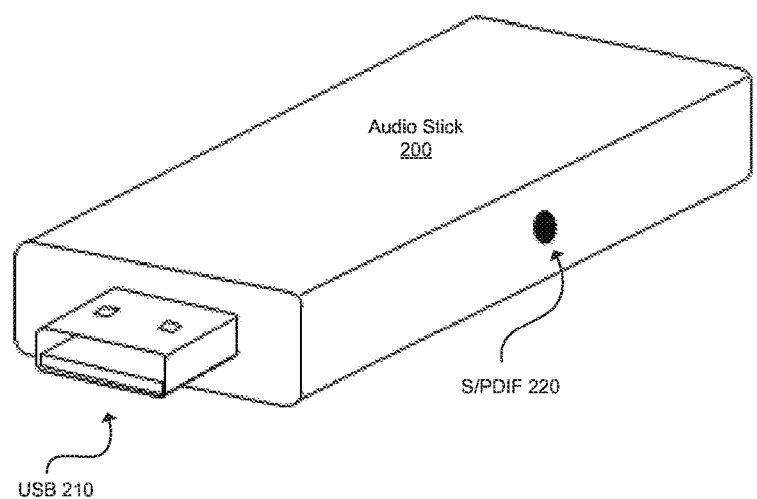
FIG. 2 is a perspective view of an audio stick 200 (see also the audio stick 110 of FIG. 1).

FIG. 2 is a perspective view of an audio stick 200 (see also the audio stick 110 of FIG. 1). The audio stick 200 has a connector 210 and an input interface 220. The connector 210 connects to the connector 121 of the display device 120 (see FIG. 1) and receives power from the display device 120. The power supplied may be 5 volts. The connector 210 is shown as a male USB connector, although a female USB connector, or other types of connectors, may be used to interface with other types of connectors of the display device 120. Although the connector 210 is shown as making a direct connection to the connector 121 of the display device 120 (see FIG. 1), the connection may also include a cord portion.

The input interface 220 receives the digital audio signal from the display device 120 (see FIG. 1) via the connector 130. The input interface 220 may be an S/PDIF interface that implements either an RCA connector (for connecting to an electrical coaxial cable) or an optical fiber (for connecting to a TOSLINK cable).

The audio stick 200 has a compact form factor, sized to fit in the palm of a hand, with a length of approximately 8 cm, a height (thickness) of approximately 1.3 cm, and a width of approximately 2.5 cm. These dimensions may exclude any protruding interfaces (e.g., the connector 210).

Figure 3:
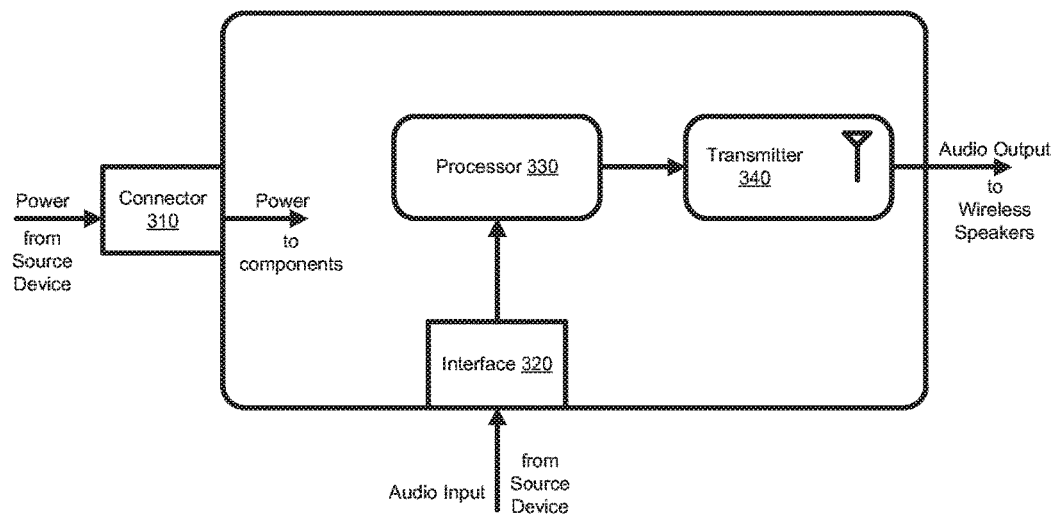
FIG. 3 is a block diagram of an audio stick 300 (see also the audio stick 110 of FIG. 1 or 200 of FIG. 2).

FIG. 3 is a block diagram of an audio stick 300 (see also the audio stick 110 of FIG. 1 or 200 of FIG. 2). The audio stick interfaces between a digital audio source device (e.g., the display device 120 of FIG. 1) and one or more wireless speakers (e.g., the wireless speakers 141-145 of FIG. 1). The audio stick 300 includes a connector 310, a digital audio interface 320, a processor 330, and a transmitter 340.

The connector 310 connects to the source device and receives power from the source device. The power is used to power the components of the audio stick 300. The connector 310 connects to the connector 121 (see FIG. 1). The connector 310 corresponds to the connector 210 (see FIG. 2). Alternatively, the connector 310 may connect to a power source other than the source device. For example, the connector 310 may connect to an alternating current (AC) adapter that is connected to an electrical outlet.

The digital audio interface 320 receives a digital audio signal from the source device. The digital audio interface 320 connects to the interface 122 (see FIG. 1), e.g. via the connector 130. The digital audio interface 320 corresponds to the input interface 220 (see FIG. 2).

The processor 330 receives the input digital audio signal from the digital audio interface 320 and generates an output digital audio signal. In general, the processor 330 performs decoding and conversion as needed from the format of the input digital audio signal to the format of the output digital audio signal. For example, if the input digital audio signal is in compressed 7.1 surround sound format and the wireless speakers receive data according to the WiFi™ protocol, the processor 330 converts the compressed 7.1 surround sound format input signal to the WiFi™ protocol output signal.

The transmitter 340 receives the output digital audio signal from the processor 330 and transmits the output digital audio signal to the wireless speakers via a wireless signal path. For example, if the wireless speakers receive data according to the WiFi™ protocol, the transmitter 340 transmits the output digital audio signal in WiFi™ format.

Additional details of the audio stick 300 are provided below.

Figure 4:
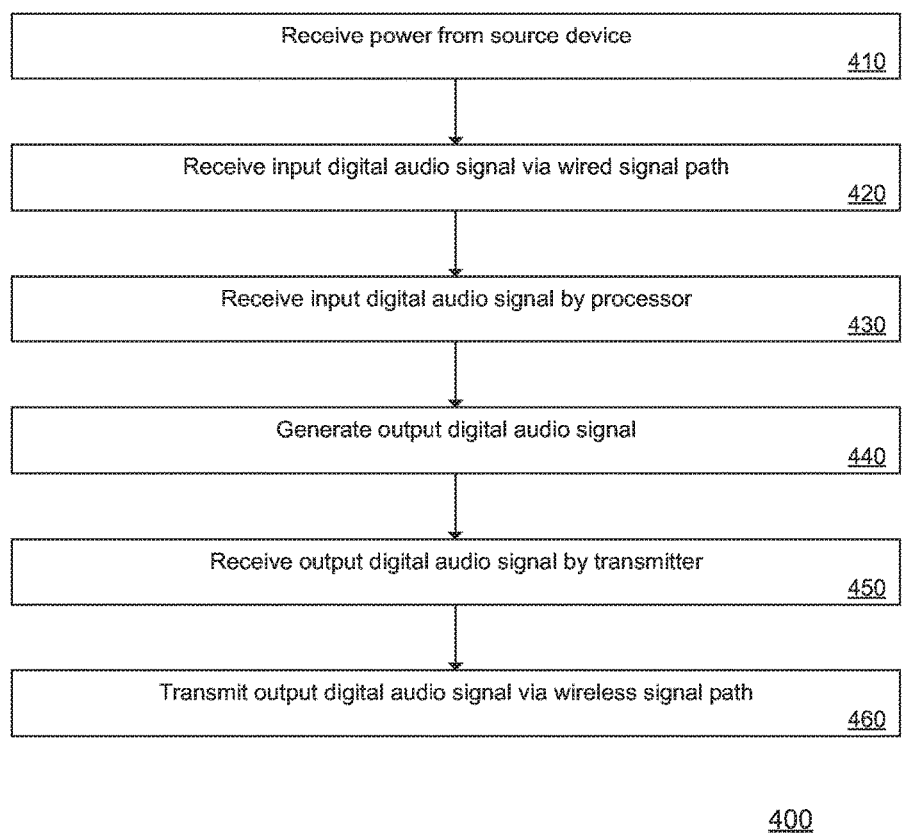
FIG. 4 is a flow diagram of a method 400 of interfacing between a digital audio source device and one or more wireless speakers.

FIG. 4 is a flow diagram of a method 400 of interfacing between a digital audio source device and one or more wireless speakers. The method 400 may be performed by the audio stick 110 of FIG. 1, 200 of FIG. 2, or 300 of FIG. 3, e.g. as controlled by one or more computer programs, programmed hardware, or firmware.

At 410, power is received from the digital audio source device by a connector that connects to the digital audio source device. For example, the connector 310 (see FIG. 3) may connect to the display device 120 (see FIG. 1) and receive power from the display device 120.

At 420, an input digital audio signal is received from the digital audio source device by an input digital audio interface via a wired signal path. For example, the interface 320 (see FIG. 3) may receive the input digital audio signal from the display device 120 (see FIG. 1) via the connector 130 (see FIG. 1).

At 430, the input digital audio signal is received, by a processor, from the input digital audio interface. For example, the processor 330 (see FIG. 3) receives the input digital audio signal from the interface 320 (see FIG. 3).

At 440, an output digital audio signal is generated by the processor. For example, the processor 330 (see FIG. 3) generates the output digital audio signal. The processor may perform decoding, encoding, de-formatting, formatting, etc. based upon the specific protocols of the input and output digital audio signals.

At 450, the output digital audio signal is received, by an output audio transmitter, from the processor. For example, the transmitter 340 (see FIG. 3) receives the output digital audio signal from the processor 330 (see FIG. 3).

At 460, the output digital audio signal is transmitted, by the output audio transmitter, to the one or more wireless speakers via a wireless signal path. For example, the transmitter 340 (see FIG. 3) transmits the output digital audio signal to the wireless speakers 141-145 (see FIG. 1).

Figure 5:
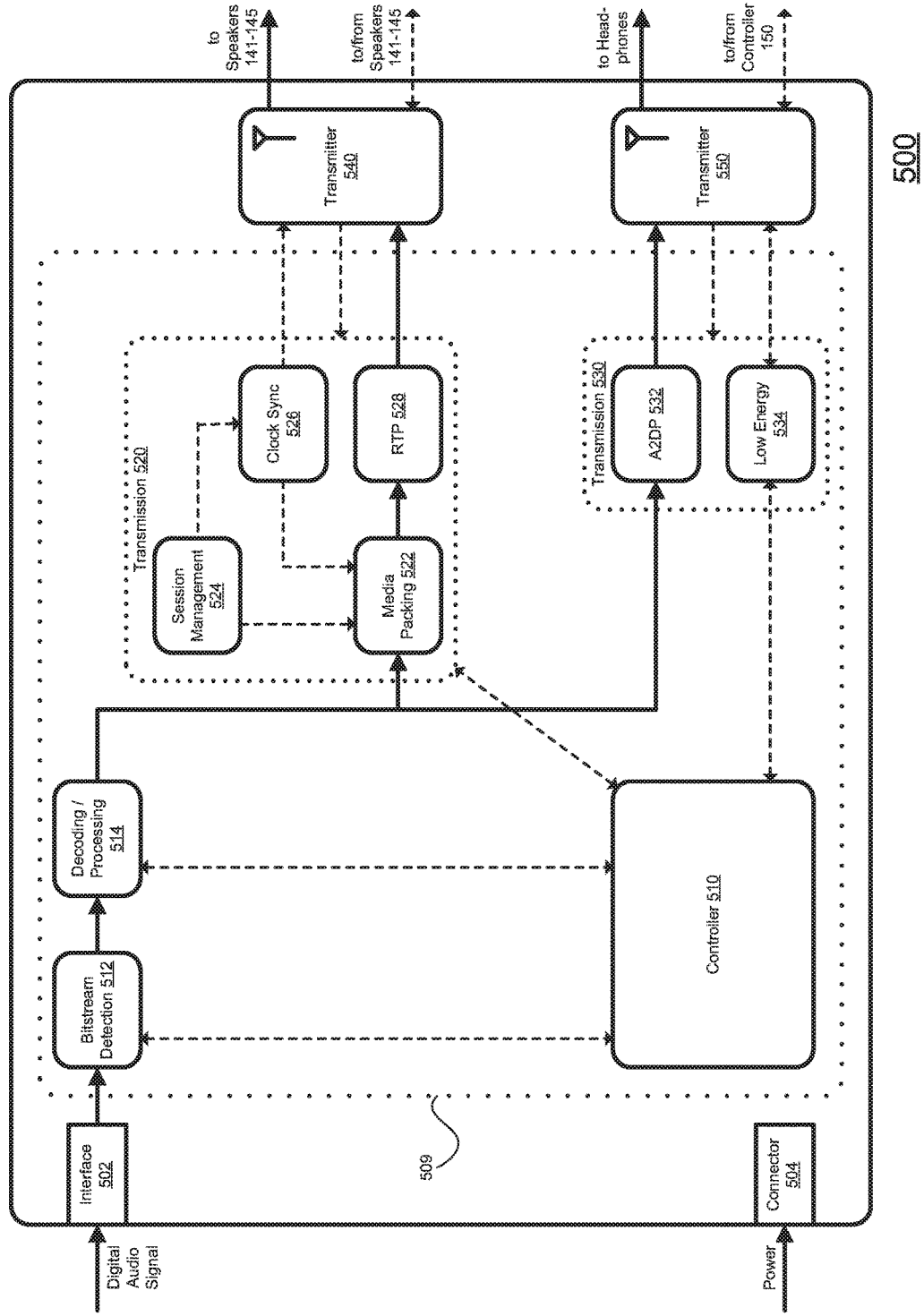
FIG. 5 is a block diagram of an audio stick 500 (see also the audio stick 110 of FIG. 1, 200 of FIG. 2 or 300 of FIG. 3).

FIG. 5 is a block diagram of an audio stick 500 (see also the audio stick 110 of FIG. 1, 200 of FIG. 2 or 300 of FIG. 3). For convenience of description, the components are categorized as hardware components and software components. Note that the software components are stored by, and executed by, hardware components (e.g., a memory, a processor such as the processor 330 of FIG. 3, etc.) that are not shown. The hardware components include an interface 502 (see also the interface 220 of FIG. 2 or 320 of FIG. 3), a connector 504 (see also the connector 210 of FIG. 2 or 310 of FIG. 3), and two transmitters 540 and 550. The software components (bounded by the dotted rectangle 509) include a controller module 510, a bitstream detection module 512, an audio decoding and processing module 514, and transmission modules 520 and 530.

The transmission module 520 includes a media packing module 522, a session management module 524, a clock synchronization module 526, and a real-time transport protocol (RTP) module 528. The transmission module 530 includes a Bluetooth™ advanced audio distribution profile (A2DP) module 532, and a Bluetooth™ low energy (LE) module 534. The transmission module 520 and the transmission module 530 may be collectively referred to as a wireless transceiver (see also the transmitter 340 of FIG. 3).

The interface 502 corresponds to the interface 220 (see FIG. 2) or 320 (see FIG. 3). The interface 502 connects to a source device (e.g., the display device 120 of FIG. 1), e.g. via the connector 130 (see FIG. 1), and receives the digital audio signal from the source device.

The connector 504 corresponds to the connector 210 (see FIG. 2) or 310 (see FIG. 3). The connector 504 connects to the source device (e.g., the display device 120 of FIG. 1) and receives power from the source device. The connector 504 provides the power to the hardware components of the audio stick 500.

The controller module 510 generally controls the operation of the audio stick 500 by exchanging control information (shown as dashed lines) with the various components of the audio stick 500. The controller module 510 also exchanges control information with the controller 150 (see FIG. 1) via the Bluetooth™ LE module 534. This control information may include pairing information, volume control information, mute on/off information, power on/off information, etc.

The bitstream detection module 512 receives the digital audio signal from the interface 502 and performs bitstream detection on the digital audio signal. For example, if the input audio is stereo PCM, this audio may be passed directly to a post-processing component. If the audio is encoded (e.g. Dolby Digital™), it is first passed through a decoder before post-processing and transmission.

The audio decoding and processing module 514 receives the digital audio signal from the bitstream detection module 512, performs decoding of the digital audio signal, and performs processing on the digital audio signal. The audio decoding and processing module 514 provides the processed digital audio signal to the media packing module 522 and the Bluetooth™ A2DP module 532.

The transmission module 520 generally processes the processed digital audio signal for wireless transmission. The transmission module 520 may implement the IEEE 802.11 transmission protocol, the WiFi™ transmission protocol, etc.

The media packing module 522 receives the processed digital audio signal from the audio decoding and processing module 514, performs media packing on the processed digital audio signal, and provides the packed digital audio signal to the RTP module 528.

The session management module 524 performs capabilities exchange and session management for the wireless transmission, by sending control information to the media packing module 522 and the clock synchronization module 526. The session management module 524 also receives control information back from the wireless speakers 141-145.

The clock synchronization module 526 generates timing information and clock synchronization information for the wireless transmission, by sending control information to the media packing module 522 and the transmitter 540.

The RTP module 528 controls streaming of the digital audio signal. The RTP module 528 receives the digital audio signal from the audio decoding and processing module 514 and provides the digital audio signal to the transmitter 540 for transmission to the wireless speakers (e.g., the wireless speakers 141-145 of FIG. 1).

The transmission module 530 generally processes the processed digital audio signal for Bluetooth™ protocol transmission, as well as exchanges control information with the controller 150 (see FIG. 1) and the controller module 510.

The Bluetooth™ A2DP module 532 receives the digital audio signal from the audio decoding and processing module 514, performs A2DP processing on the digital audio signal, and provides the digital audio signal to the transmitter 550. In general, the A2DP processing includes formatting the digital audio signal as an audio stream in up to two channel stereo.

The Bluetooth™ LE module 534 exchanges control information with the controller module 510, and with the transmitter 550 for communication with the controller 150 (see FIG. 1). The Bluetooth™ LE module 534 may control paring the audio stick 500 and the controller 150. Once the audio stick 500 and the controller 150 are paired, the controller 150 and the controller module 510 may exchange control information to control the operation of the audio stick 500.

The transmitter 540 receives the digital audio signal from the RTP module 528 and transmits the digital audio signal to the wireless speakers (e.g., the wireless speakers 141-145 of FIG. 1). The transmitter 540 is controlled by the timing information and clock synchronization information from the clock synchronization module 526. The transmitter 540 may output the digital audio signal according to the 802.11 protocol, the WiFi™ protocol, etc. The transmitter 540 may include a receiver, and may be referred to as the transceiver 540. The transmitter 540 may exchange control information between the wireless speakers 141-145 and the transmission module 520.

The transmitter 550 receives the digital audio signal from the Bluetooth™ A2DP module 532 and transmits the digital audio signal to wireless headphones (not shown). The transmitter 550 may transmit the digital audio signal as a Bluetooth™ audio stream signal. The wireless headphones may be paired to the audio stick 500, and the controller 150 (see FIG. 1) may be used to select between the wireless headphones and the wireless speakers to receive the digital audio signal. The transmitter 550 may include a receiver, and may be referred to as the transceiver 550. The transmitter 550 may exchange control information between the headphones and the transmission module 530.

The transmitter 550 exchanges control information between the audio stick 500 (e.g., to or from the Bluetooth™ LE module 534) and the controller 150 (see FIG. 1). The control information may include pairing information (to pair the audio stick 500 and the controller 150). The control information may include information from the controller 150 to the audio stick 500, such as volume control information, power on/off information, etc. The control information may include information from the audio stick 500 to the controller 150, such as status information.

Additional Features and Implementation Details

The following sections provide more details regarding additional features and implementation details. These details may be implemented in any of the above-described audio sticks, systems, or related components (e.g., the controller 150 of FIG. 1). Similar names are used for similar components.

Summary

The audio stick (e.g., the audio stick 110 of FIG. 1, 200 of FIG. 2, 300 of FIG. 3, 500 of FIG. 5, etc.) has the form factor of a stick or dongle for connection to a source device such as a television. The audio stick includes wireless audio capabilities for connecting to one or more wireless audio speakers. The audio stick represents a low cost of entry for a casual home entertainment consumer.

Remote Control

The remote (e.g., the controller 150 of FIG. 1) may pair with the audio stick over wireless (e.g., Bluetooth™, WiFi™, etc.), and interactively controls the audio stick. In general, the remote control device includes a microcontroller, a wireless radio, and user interface components (e.g., a screen, buttons, etc.). The microcontroller controls the general operation of the remote control device, such as receiving user inputs from buttons or other input devices, managing state information of the remote control and associated devices, and managing information exchanges with the wireless radio. The wireless radio generally connects (pairs) the remote control with the audio stick. The wireless radio may implement an IEEE 802.15.1 standard radio (e.g., Bluetooth™ radio, Bluetooth™ version 4.0, etc.), a WiFi™ radio, an IEEE 802.15.4 standard radio (e.g., a ZigBee™ radio), etc.

Some of the functionality of the remote control may also be implemented in a smartphone app (e.g., an Android™ app or an iOS™ app). These functionalities are described in more detail below.

General Use Case

The general use case is as described above with reference to FIG. 1. The system generally performs surround decoding to wireless speakers from a source device. The audio stick performs inline surround decoding (e.g., upmixing and other post-processing for Dolby Digital™, Dolby Surround™, etc.), and then wirelessly transmits the appropriate surround audio to paired wireless speakers. Various wireless protocols (e.g., WiFi Direct™) may be used to connect to the wireless speakers. As an example, extensions to the Miracast™ protocol may be used for controlling the transmissions to the wireless speakers. These wireless speakers may also include additional extensions, which may enable such things as arbitrary speaker placement, low power battery management for portable speakers, etc.

Initial Device Setup

The remote control or a smartphone app may be used to perform the initial setup of the audio stick. This setup process may involve some steps that do not have to be repeated for typical usage of the system. For example, the user may enter information pertaining to the wireless network access point, which wireless speakers are available, and which devices is the audio stick connected to.

The setup process is generally as follows. First, the user connects the audio stick to a USB connector of the display device (e.g., a television), to provide power to the audio stick. Next, the user connects an audio output of the display device to the audio input of the audio stick (e.g., using a S/PDIF connector). Next, the user runs the smartphone app (e.g., an iOS™ app or an Android™ app) for controlling the audio stick. Next, the user uses the smartphone app to connect to the audio stick via wireless (e.g., WiFi Direct™). Next, using the mobile app, the user selects to set up a new audio stick. Next, using the mobile app, the user identifies what speakers should be connected to the device. Next, using the mobile app, the user enters the login credentials for their home wireless (e.g., WiFi™) access point. Next, using the mobile app, the user enters any other relevant preferences. Finally, using the mobile app, the user finalizes their selections which are transferred to and saved in the audio stick.

Volume Control Changes

One common interaction between the user and the audio stick is the changing of volume as well as muting. The remote control transmits the appropriate command to the audio stick to change volume. In turn, this will cause the audio stick to lower or boost the volume of the audio sent to the wireless speakers, or cause the paired wireless speakers to properly lower or boost their volume.

Firmware Updates for Audio Stick

A user may choose to have firmware updated automatically or be prompted for updates. When an update is ready and is authorized by the user, it shall download in the background. The user may choose to have the update installed when the system is not in use, or immediately.

Audio Format Support

The audio stick may implement PCM audio with encoded audio support. The PCM audio may be up to 2 channels of linear PCM (LPCM), at up to 48 kHz. The encoded audio support may include Dolby Digital™.

Auto-Calibration

The audio stick may also perform the central processing for auto-calibrating speakers. Through the use of extensions to Miracast™ signals or other WiFi™ based protocols, each connected speaker may include one or more microphones, and may continually monitor the audio produced by other connected speakers. This monitored audio may then be retransmitted back to the audio stick and used to determine the relative locations of each speaker.

For example, the audio stick 500 (see FIG. 5) may implement auto-calibration. The transmitter 540 may receive information from the wireless speakers 141-145 (see FIG. 1), generated by the microphone on each speaker. This information is processed by the controller module 510 to pull out the relative location information of the speakers, which the controller module 510 uses to perform auto-calibration of the digital audio signal. The controller module 510 may implement an auto-discovery process to perform the auto-calibration processing.

Communication with Wireless Speakers

The audio stick may use various protocols to communicate with the wireless speakers. One protocol is the Miracast™ protocol, also referred to as the WiFi Display™ protocol. Another protocol is the Audio Video Bridging (AVB) standard (IEEE 802.1 standard), aksi referred to as the AVnu™ standard. Another protocol may be extensions or modifications of the Miracast™ protocol, or other WiFi™ based protocols. These protocols define the functionality of the source device (e.g., the audio stick 110 of FIG. 1) and the sink device (e.g., the wireless speakers 141-145) for the wireless transmission. (Note that the Bluetooth™ connection to the headphones have a more direct path, through the use of the A2DP Bluetooth™ profile.)

Source Device

The source device includes a source module that accepts audio data from an audio source and outputs this audio data to the paired wireless speakers. The source module manages the connection with each wireless speaker by performing the stream negotiation (e.g., according to the Internet Engineering Task Force (IETF) RFC 2326 standard, the WiFiDisplay™ Real Time Streaming Protocol (RTSP) protocol, etc.). After each wireless speaker negotiation is completed, the source module outputs a stereo audio stream over User Datagram Protocol (UDP). This stream is a series of Real-time Transport Protocol (RTP) packets that packetizes a transport stream (e.g., an International Telecommunication Union (ITU) H.222/H.262 transport stream, a Moving Picture Experts Group MPEG-2 transport stream, etc.) containing the audio in one single Packetized Elementary Stream (PES). The source module also communicates with each wireless speaker over RTP Control Protocol (RTCP) for timing and synchronization information. The controller module 510 (see FIG. 5) may implement the source module.

The source module may include a session handler subcomponent, a multiplexer/encoder subcomponent, and a network connectivity subcomponent.

The session handler subcomponent performs much of the control for the source module. The session handler subcomponent is responsible for managing the RTSP negotiations with the wireless speakers. During the negotiation, the session handler subcomponent receives the requested speaker feed from each wireless speaker, and transmits this information to the multiplexer/encoder subcomponent. The session handler subcomponent may be responsible for managing up to ten simultaneous connections with the wireless speakers. The session handler subcomponent may run in its own thread, separate from the network session and the multiplexer, in order to avoid any stall in audio encoding and transmission. The session handler subcomponent may receive messages from the network session thread when data is received on the RTSP/RTCP ports for the wireless speakers, and it may notify the network session thread when RTSP data is ready to be sent to the wireless speakers.

The session handler subcomponent may act as a proxy in between the multiplexer/encoder subcomponent and the network connectivity subcomponent. The multiplexer/encoder subcomponent will notify the session handler subcomponent when audio data is ready to be sent out, and the session handler subcomponent will notify the network connectivity subcomponent. This should help eliminate coupling between the network connectivity subcomponent and multiplexer/encoder subcomponent.

The multiplexer/encoder subcomponent is responsible for receiving one or more channels of PCM and outputting stereo audio streams for each requested wireless speaker. The multiplexer/encoder subcomponent chooses the appropriate stereo pair from the 16 channel input, and performs PES, TS, and RTP packetization on the audio. This stream of RTP packets is fed back to the session handler subcomponent for transmission to the wireless speakers. The multiplexer/encoder subcomponent may support up to 10 outputs. The input audio may be a consistent 16 channel PCM audio stream. Not all channels may be active, but they may be present in order to simplify operation. Further, a channel may appear more than once in the output speaker configuration—it may be possible to have e.g. two left channels, and the multiplexer/encoder subcomponent supports this.

The network connectivity subcomponent is responsible for maintaining socket communications with the wireless speakers. Each wireless speaker may have bidirectional RTSP and RTCP communication. In addition, each wireless speaker receives a UDP stream of the packetized audio output by the multiplexer/encoder subcomponent. The network connectivity subcomponent prioritizes sending audio data while also handling communications between the wireless speakers and the session handler subcomponent. The network connectivity subcomponent may receive data for all the wireless speakers simultaneously from the session handler subcomponent, to ensure that data does not get out of sync. Similarly, audio data should be transmitted to all of the speakers as quickly as possible, likely in a critical loop that cannot be interrupted. The network connectivity subcomponent may manage one or more speakers, each with 3 sockets—RSTP, RTCP, and UDP.

Sink Device

Each sink device (e.g., the wireless speakers 141-145) includes a sink module that communicates with the source module. The sink module may implement several communication protocols: RTSP for connection setup, RTP for audio transport, RTCP for bi-directional command communication, and gPTP (generalized Precision Time Protocol, IEEE 802.1AS) for clock synchronization.

The setup sequence is generally as follows. The source module initiates a TCP/IP connection to the sink module and begins the RTSP message exchange. During this process, the connection parameter, including the RTP and RTCP port numbers, are being exchanged. This information is used to establish a UDP/IP connection with RTP, which allows for a MPEG transport stream to be sent to the sink module. This transport stream may carry one audio elementary stream. A bidirectional UDP/IP connection is also established for the RTCP control channel, which allows for messages exchange between the source module and the sink module. The gPTP messages can be routed via RTCP messages, to establish synchronized real-time clocks between the source module and the sink module.

Implementation Details

An embodiment may be implemented in hardware, executable modules stored on a computer readable medium, or a combination of both (e.g., programmable logic arrays). Unless otherwise specified, the steps executed by embodiments need not inherently be related to any particular computer or other apparatus, although they may be in certain embodiments. In particular, various general-purpose machines may be used with programs written in accordance with the teachings herein, or it may be more convenient to construct more specialized apparatus (e.g., integrated circuits) to perform the required method steps. Thus, embodiments may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein. (Software per se and intangible or transitory signals are excluded to the extent that they are unpatentable subject matter.)

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

Various aspects of the present invention may be appreciated from the following enumerated example embodiments (EEESs):

EEE 1. An apparatus for interfacing between a digital audio source device and one or more wireless speakers, comprising:

a connector that connects to the digital audio source device, and that receives power from the digital audio source device;

an input digital audio interface that receives an input digital audio signal from the digital audio source device via a wired signal path;

a processor that receives the input digital audio signal from the input digital audio interface, and that generates an output digital audio signal; and an output audio transmitter that receives the output digital audio signal from the processor, and that transmits the output digital audio signal to the one or more wireless speakers via a wireless signal path.

EEE 2. The apparatus of EEE 1, wherein the connector comprises a universal serial bus (USB) connector.

EEE 3. The apparatus of EEE 1, wherein the input digital audio interface comprises a Sony/Philips digital interface format (S/PDIF) interface.

EEE 4. The apparatus of EEE 1, wherein the input digital audio interface comprises a Sony/Philips digital interface format (S/PDIF) interface with a coaxial connector.

EEE 5. The apparatus of EEE 1, wherein the input digital audio interface comprises a Sony/Philips digital interface format (S/PDIF) interface with an optical connector.

EEE 6. The apparatus of EEE 1, wherein the output digital audio signal comprises a surround audio signal, and wherein the output audio transmitter transmits the surround audio signal to the one or more wireless speakers.

EEE 7. The apparatus of EEE 1, wherein the output audio transmitter implements the Institute of Electrical and Electronics Engineers (IEEE) 802.11 protocol.

EEE 8. The apparatus of EEE 1, further comprising:
a wireless transceiver that implements the Institute of Electrical and Electronics Engineers (IEEE) 802.15.1 protocol.

EEE 9. The apparatus of EEE 1, further comprising:
a wireless transceiver that includes the output audio transmitter.

EEE 10. The apparatus of EEE 1, further comprising:
a wireless transceiver, wherein the wireless transceiver exchanges information with a remote control device.

EEE 11. The apparatus of EEE 1, further comprising:
a wireless transceiver, wherein the wireless transceiver exchanges information with a mobile telephone that implements a remote control application.

EEE 12. The apparatus of EEE 1, further comprising:
a wireless transceiver, wherein the wireless transceiver exchanges information with a remote control device, wherein the information includes pairing information that pairs the apparatus and the remote control device.

EEE 13. The apparatus of EEE 1, further comprising:
a wireless transceiver, wherein the wireless transceiver exchanges information with a mobile telephone that implements a remote control application, wherein the information includes pairing information that pairs the apparatus and the mobile telephone.

EEE 14. The apparatus of EEE 1, further comprising:
a wireless transceiver, wherein the wireless transceiver exchanges information with the one or more wireless speakers, wherein the information includes pairing information that pairs the apparatus and the one or more wireless speakers.

EEE 15. The apparatus of EEE 1, wherein the one or more wireless speakers comprise a sound bar.

EEE 16. The apparatus of EEE 1, wherein the one or more wireless speakers comprise wireless headphones.

EEE 17. A method of interfacing between a digital audio source device and one or more wireless speakers, comprising:
receiving power from the digital audio source device by a connector that connects to the digital audio source device;
receiving an input digital audio signal from the digital audio source device by an input digital audio interface via a wired signal path;
receiving, by a processor, the input digital audio signal from the input digital audio interface;
generating, by the processor, an output digital audio signal;
receiving, by an output audio transmitter, the output digital audio signal from the processor; and
transmitting, by the output audio transmitter, the output digital audio signal to the one or more wireless speakers via a wireless signal path.

EEE 18. The method of EEE 17, wherein the connector comprises a universal serial bus (USB) connector.

EEE 19. The method of EEE 17, wherein the input digital audio interface comprises a Sony/Philips digital interface format (S/PDIF) interface.

EEE 20. The method of EEE 17, wherein the output digital audio signal comprises a surround audio signal, and wherein the output audio transmitter transmits the surround audio signal to the one or more wireless speakers.

EEE 21. The method of EEE 17, further comprising:
exchanging information with a remote control device.

EEE 22. The method of EEE 17, further comprising:
exchanging information with a mobile telephone that implements a remote control application.

EEE 23. The method of EEE 17, wherein the connector, the input digital audio interface, the processor, and the output audio transmitter comprise an audio stick, the method further comprising:
exchanging information with a remote control device, wherein the information includes pairing information that pairs the audio stick and the remote control device EEE 24. The method of EEE 17, wherein the connector, the input digital audio interface, the processor, and the output audio transmitter comprise an audio stick, the method further comprising:
exchanging information with a mobile telephone that implements a remote control application, wherein the information includes pairing information that pairs the audio stick and the mobile telephone.

EEE 25. The method of EEE 17, wherein the connector, the input digital audio interface, the processor, and the output audio transmitter comprise an audio stick, the method further comprising:
exchanging information with the one or more wireless speakers, wherein the information includes pairing information that pairs the audio stick and the one or more wireless speakers.

EEE 26. An apparatus for interfacing between a digital audio source device and one or more wireless speakers, comprising:
first means for connecting to the digital audio source device, and for receiving power from the digital audio source device;
second means for receiving an input digital audio signal from the digital audio source device via a wired signal path;
third means for receiving the input digital audio signal from the second means, and for generating an output digital audio signal; and
fourth means for receiving the output digital audio signal from the third means, and for transmitting the output digital audio signal to the one or more wireless speakers via a wireless signal path.

EEE 27. A system for interfacing with a digital audio source device, comprising:
one or more wireless speakers; and
an audio stick, including:
a connector that connects the audio stick to the digital audio source device, and that provides power from the digital audio source device to the audio stick;
an input digital audio interface that receives an input digital audio signal from the digital audio source device via a wired signal path;
a processor that receives the input digital audio signal from the input digital audio interface, and that generates an output digital audio signal;
an output audio transmitter that receives the output digital audio signal from the processor, and that transmits the output digital audio signal via a wireless signal path to the one or more wireless speakers,
wherein the one or more wireless speakers receive the output digital audio signal via the wireless signal path, and output an acoustic signal that corresponds to the output digital audio signal.

EEE 28. The system of EEE 27, wherein the one or more wireless speakers comprises a plurality of wireless speakers, wherein the audio stick further comprises a wireless transceiver, wherein the wireless transceiver exchanges information with the plurality of wireless speakers, wherein the information includes relative location information of the plurality of wireless speakers, and wherein the processor performs auto-calibration of the output audio signal according to the relative location information.

EEE 29. The system of EEE 27, wherein the audio stick further comprises a wireless transceiver, the system further comprising:
a remote control that exchanges information with the audio stick via the wireless transceiver.

EEE 30. The system of EEE 27, further comprising:
a source device that generates the input digital audio signal, wherein the source device comprises the digital audio source device.

The invention claimed is:
1. An apparatus for interfacing between a digital audio source device and two or more wireless speakers, comprising:
a connector that connects to the digital audio source device, and that receives power from the digital audio source device, wherein the apparatus is powered by the received power;
an input digital audio interface that receives an input digital audio signal from the digital audio source device via a wired signal path;

a processor that receives the input digital audio signal from the input digital audio interface, and that generates an output digital audio signal comprising a surround audio signal; and a wireless transceiver including an output audio transmitter that receives the output digital audio signal from the processor, and that transmits two or more calibration tones and the output digital audio signal to the two or more wireless speakers via a wireless signal path, wherein each calibration tone is unique for one of the wireless speakers, wherein the wireless transceiver receives audio data from a first wireless speaker via the wireless signal path, and wherein the audio data has been recorded by the first wireless speaker from one of the calibration tones rendered by a second wireless speaker.

2. The apparatus of claim 1, wherein the processor determines, based on a comparison between the audio data and an original calibration tone, a relative location of the first wireless speaker or the second wireless speaker, and generates the output digital audio signal comprising the surround audio signal based on the determined relative location and the input digital audio signal.

3. The apparatus of claim 2, wherein the processor determines relative locations for a plurality of wireless speakers.

4. The apparatus of claim 1, wherein the connector comprises a universal serial bus (USB) connector.

5. The apparatus of claim 1, wherein the input digital audio interface comprises a Sony/Philips digital interface format (S/PDIF) interface, optionally with a coaxial connector or an optical connector.

6. The apparatus of claim 1, wherein the output audio transmitter implements the Institute of Electrical and Electronics Engineers (IEEE) 802.11 protocol.

7. The apparatus of claim 1, wherein the wireless transceiver implements the Institute of Electrical and Electronics Engineers (IEEE) 802.15.1 protocol.

8. The apparatus of claim 1, wherein the wireless transceiver exchanges information with one of a remote control device, a mobile telephone that implements a remote control application or the two or more wireless speakers.

9. The apparatus of claim 8, wherein the information includes pairing information that pairs the apparatus and the remote control device, mobile telephone or the two or more wireless speakers.

10. The apparatus of claim 1, wherein the two or more wireless speakers comprise a sound bar.

11. A method of interfacing between a digital audio source device and two or more wireless speakers with an interface apparatus, the method comprising:

receiving power from the digital audio source device by a connector that connects to the digital audio source device, wherein the interface apparatus is powered by the received power;

receiving an input digital audio signal from the digital audio source device by an input digital audio interface via a wired signal path;

receiving, by a processor, the input digital audio signal from the input digital audio interface;

generating, by the processor, an output digital audio signal comprising a surround audio signal;

receiving, by an output audio transmitter of a wireless transceiver, the output digital audio signal from the processor;

transmitting, by the output audio transmitter, two or more calibration tones and the output digital audio signal to the two or more wireless speakers via a wireless signal path, wherein each calibration tone is unique for one of the wireless speakers; and receiving, by the wireless transceiver, audio data from a first wireless speaker via the wireless signal path, wherein the audio data has been recorded by the first wireless speaker from one of the calibration tones rendered by a second wireless speaker.

12. The method of claim 11, further comprising determining, by the processor, based on a comparison between the audio data and an original calibration tone, a relative location of the first wireless speaker or the second wireless speaker, and generating, by the processor, the output digital audio signal comprising the surround audio signal based on the determined relative location and the input digital audio signal.

13. A system for interfacing with a digital audio source device, comprising:

two or more wireless speakers; and an audio stick, including:

a connector that connects the audio stick to the digital audio source device, and that provides power from the digital audio source device to the audio stick, wherein the audio stick is powered by the received power;

an input digital audio interface that receives an input digital audio signal from the digital audio source device via a wired signal path;

a processor that receives the input digital audio signal from the input digital audio interface, and that generates an output digital audio signal comprising a surround audio signal; and a wireless transceiver including an output audio transmitter that receives the output digital audio signal from the processor, and that transmits two or more calibration tones and the output digital audio signal via a wireless signal path to the two or more wireless speakers, wherein each calibration tone is unique for one of the wireless speakers, wherein the two or more wireless speakers receive the output digital audio signal via the wireless signal path, and output an acoustic signal that corresponds to the output digital audio signal, and the wireless transceiver receives audio data from a first wireless speaker via the wireless signal path, and wherein the audio data has been recorded by the first wireless speaker from one of the calibration tones rendered by a second wireless speaker.

14. The system of claim 13, wherein the processor determines, based on a comparison between the audio data and an original calibration tone, a relative location of the first wireless speaker or the second wireless speaker, and generates the output digital audio signal comprising the surround audio signal based on the determined relative location and the input digital audio signal.

15. The system of claim 14, wherein the processor determines relative locations for a plurality of wireless speakers.

16. The system of claim 13, wherein the connector comprises a universal serial bus (USB) connector.

17. The system of claim 13, wherein the input digital audio interface comprises a Sony/Philips digital interface format (S/PDIF) interface, optionally with a coaxial connector or an optical connector.

18. The system of claim 13, wherein the wireless transceiver exchanges information with one of a remote control device, a mobile telephone that implements a remote control application or the two or more wireless speakers.

19. The system of claim 18, wherein the information includes pairing information that pairs the apparatus and the remote control device, mobile telephone or the two or more wireless speakers.

20. The system of claim 13, wherein the two or more wireless speakers comprise a sound bar.

* * * * *